United States Patent [19]

Yamada

[11] Patent Number: 5,473,359
[45] Date of Patent: Dec. 5, 1995

[54] IMAGE FORMING APPARATUS

[75] Inventor: Junji Yamada, Tokyo, Japan

[73] Assignee: Kabushiki Kaisha Toshiba, Kawasaki, Japan

[21] Appl. No.: 124,194

[22] Filed: Sep. 21, 1993

[30] Foreign Application Priority Data

Mar. 19, 1993 [JP] Japan ................................... 5-059898

[51] Int. Cl.⁶ .................................................. H04N 1/21
[52] U.S. Cl. ........................... 347/247; 347/132; 358/296
[58] Field of Search ...................................... 358/296, 298, 358/300, 302; 347/132, 237, 240, 247, 250, 251, 252

[56] References Cited

U.S. PATENT DOCUMENTS 4,394,685  7/1983  Yeomans et al. ..................... 358/296
4,841,371  6/1989  Nakajima et al. ...................... 358/466
4,910,532  3/1990  Hiraguchi ................................ 347/250

FOREIGN PATENT DOCUMENTS 63-85560  4/1988  Japan.

*Primary Examiner*—Mark J. Reinhart
*Attorney, Agent, or Firm*—Foley & Lardner

[57] ABSTRACT

The laser beam printer apparatus can superimpose adding printing data, which is different from printing data, on printing data after bit map image data is expanded to printing data or while bit map image data is expanding. Adding printing data is synthesized with printing data at a predetermined period on basis of a clock supplied from either a main controlling unit or an image forming control section. Therefore, new printing data such as symbols and marks can be simultaneously outputted without newly remaking printing data.

11 Claims, 11 Drawing Sheets

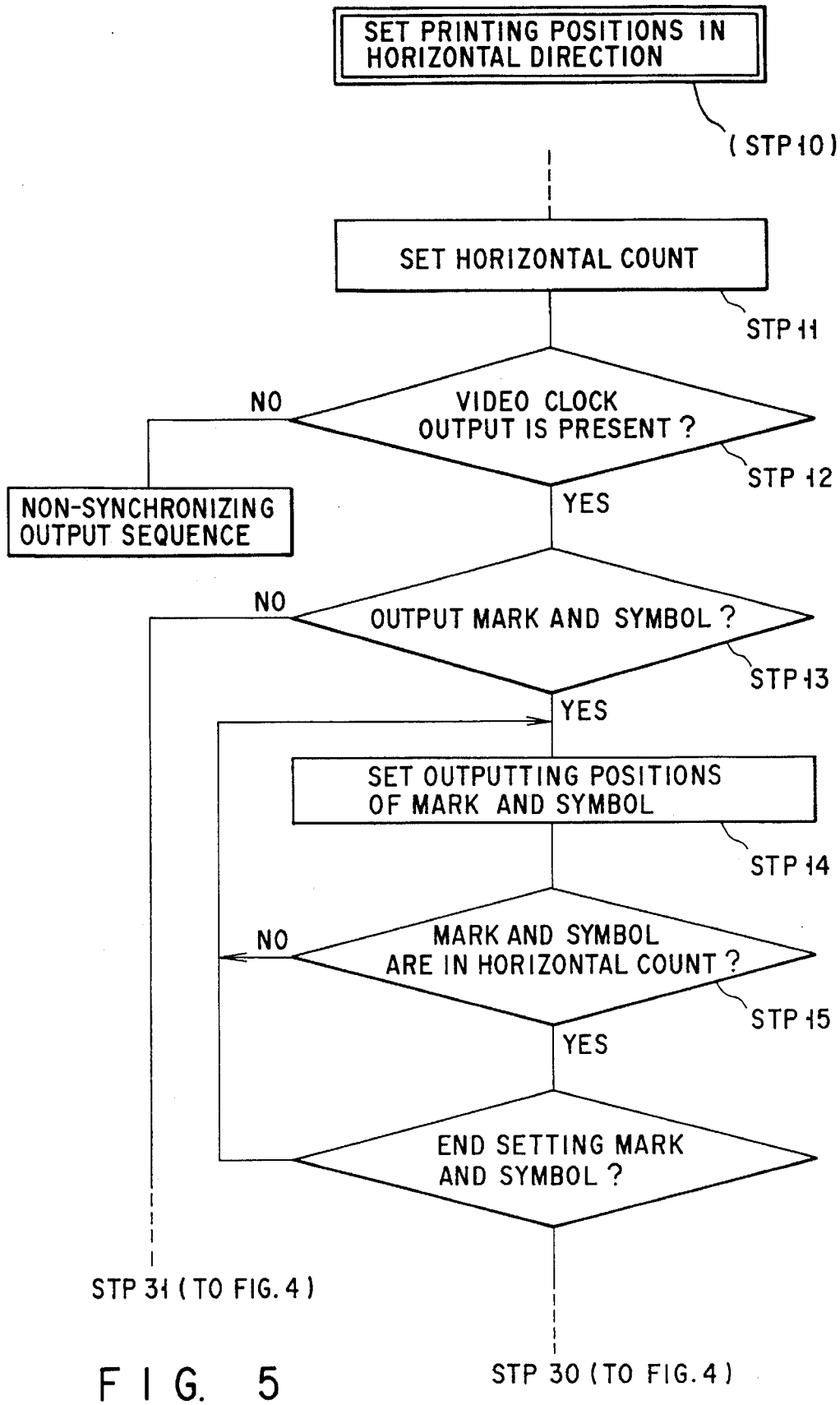
F I G. 5

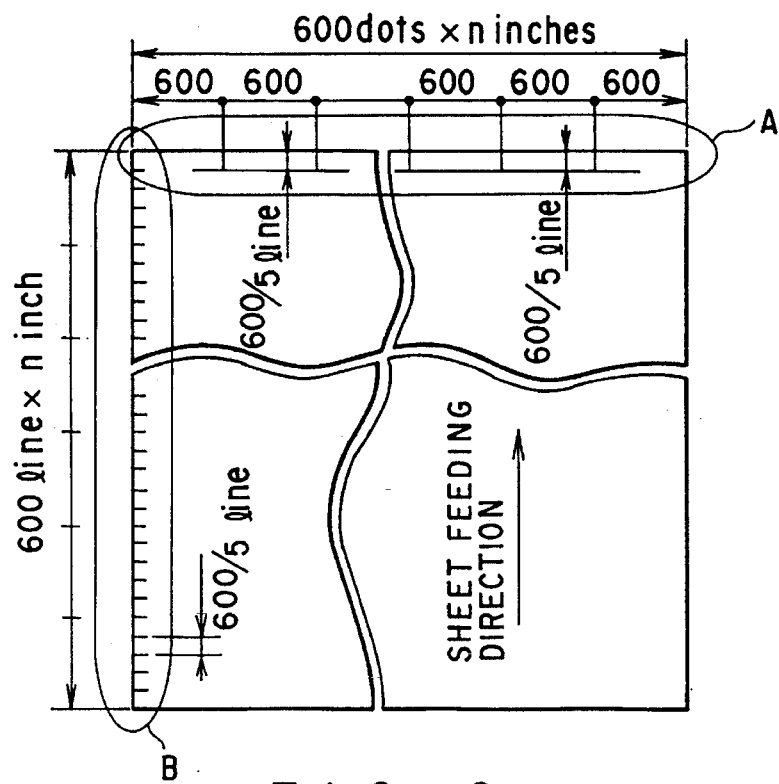
F I G. 9
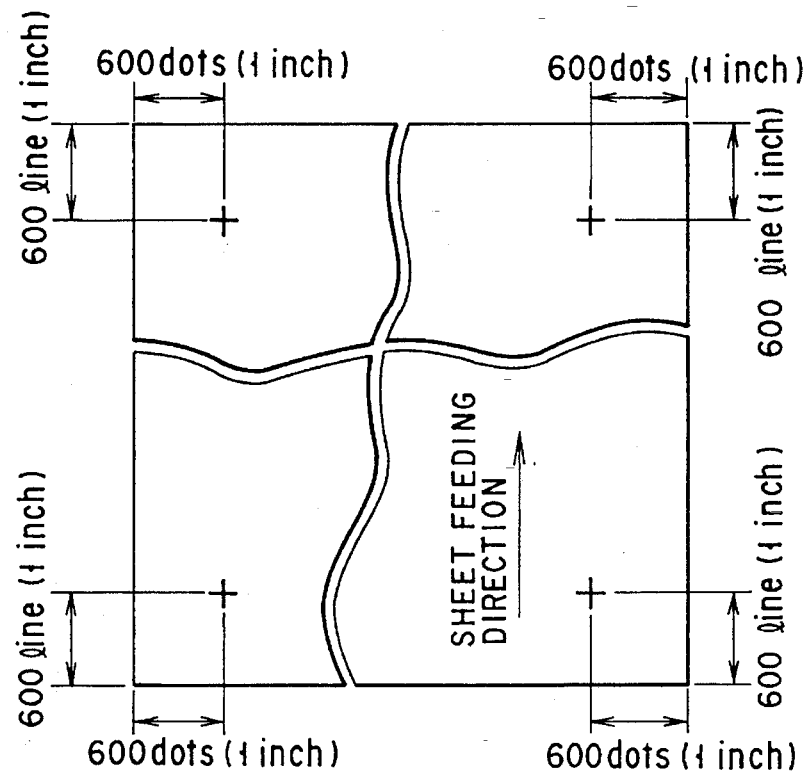
F I G. 10

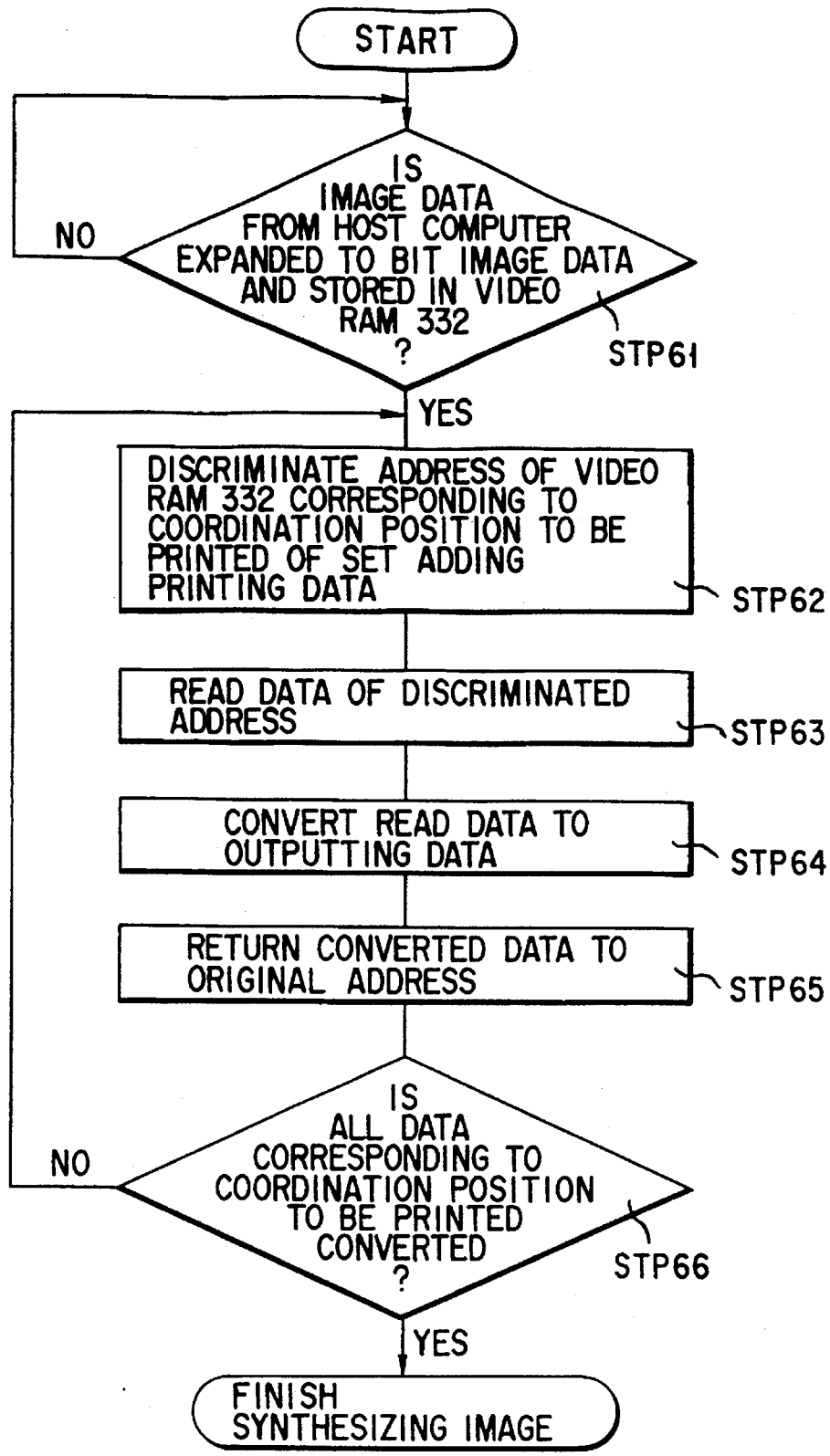
F I G. 11

IMAGE FORMING APPARATUS

BACKGROUND OF THE INVENTION

1. Field of the Invention

This invention relates to an image forming apparatus, more particularly to an image forming apparatus, which can form a toner image by an electrostatic copying process based on image data sent supplied from an outer unit, and output the image on sheet material.

2. Description of the Related Art

The image forming apparatus such as a laser beam printer receives image data from an outer unit such as a host computer or a wordprocessor, develops received data to bit image data, and prints out an image on sheet. However, in order to add data excepting characters, marks, or figures included in image data, such as a central mark showing a center of sheet, data must be directly added to image data itself supplied from a host computer.

In other words, in the case that an image to be printed is supplied from the wordprocessor, it is required that the central mark be added to image data stored in the wordprocessor. Similarly, in the case that image data is supplied from the host computer, the central mark cannot be added to image data if the central mark is not passed through the host computer.

As mentioned above, data to be added to image data such as the central mark showing the center of sheet must be newly inputted through the image data forming apparatus or image data supplying apparatus.

Since image data, which is already completed, must be newly remade in order to newly input data to be added, a large amount of time is required. Also, in the case that the host computer is provided at a remote place, there is substantial difficulty in that data to be immediately added is incorporated to image data once transmitted. On the other hand, remaking image data, which is already completed, must be avoided since there is a possibility that erroneous data will be newly inputted.

SUMMARY OF THE INVENTION

An object of the present invention is to provide an image forming apparatus, which can add new image data separately from image image in forming an image based on supplied image data.

Another object of the present invention is to provide an image forming apparatus, which can superimpose another image data supplied from an outer unit on image data to be outputted.

Further, another object of the present invention is to provide an image forming apparatus which can output another image data (marks or symbols) having a repetition rule provided in accordance with a specific timing to image data to be outputted.

According to the present invention, there is provided an image forming apparatus for forming an image on an image bearing member based on an image data, comprising: means for generating a clock signal; means for outputting the image data in response to the clock signal output from the generating means; means for forming the image based on the image data in a plurality of positions on the image bearing member, each of the positions of the image formed on the image bearing member corresponding to each of the clock signals; means for setting an adding image to be added in the image; means for determining a specific clock signal in the clock signals, the specific clock signal representing a position where the set adding image is formed on the image bearing member; means for detecting that the specific clock signal has been output by the generating means while the forming means forms the image; and means for controlling the forming means so as to form the adding image corresponding to the detecting result by the detecting means irrespective of the image data.

Moreover, according to the present invention, there is provided a method for forming an image on an image bearing member based on an image data, comprising the steps of: generating a clock signal; outputting the image data in response to the clock signal; forming the image based on the image data in a plurality of positions on the image bearing member, each of the positions of the image formed on the image bearing member corresponding to each of the clock signals; setting an adding image to be added in the image; determining a specific clock signal in the clock signals, the specific clock signal representing a position where the set adding image is formed on the image bearing member; detecting that the specific clock signal has been output by the generating step while the forming step forms the image; and controlling the forming step so as to form the adding image corresponding to the detecting result by the detecting step irrespective of the image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a flow chart showing the processing in the horizontal direction in connection with the flow chart shown in FIG. 4;

FIGS. 9 and 10 are block diagrams showing one example of marks outputted in accordance with FIGS. 4 to 6 or 7; and FIG. 11 is a flow chart showing a method in which new printing data shown in FIG. 4 is added, that is, an example in which printing data is supplied from the outer unit.

DETAILED DESCRIPTION OF THE PREFERRED EMBODIMENTS

Embodiments of the present invention will be explained with reference to the drawings.

Figure 1:
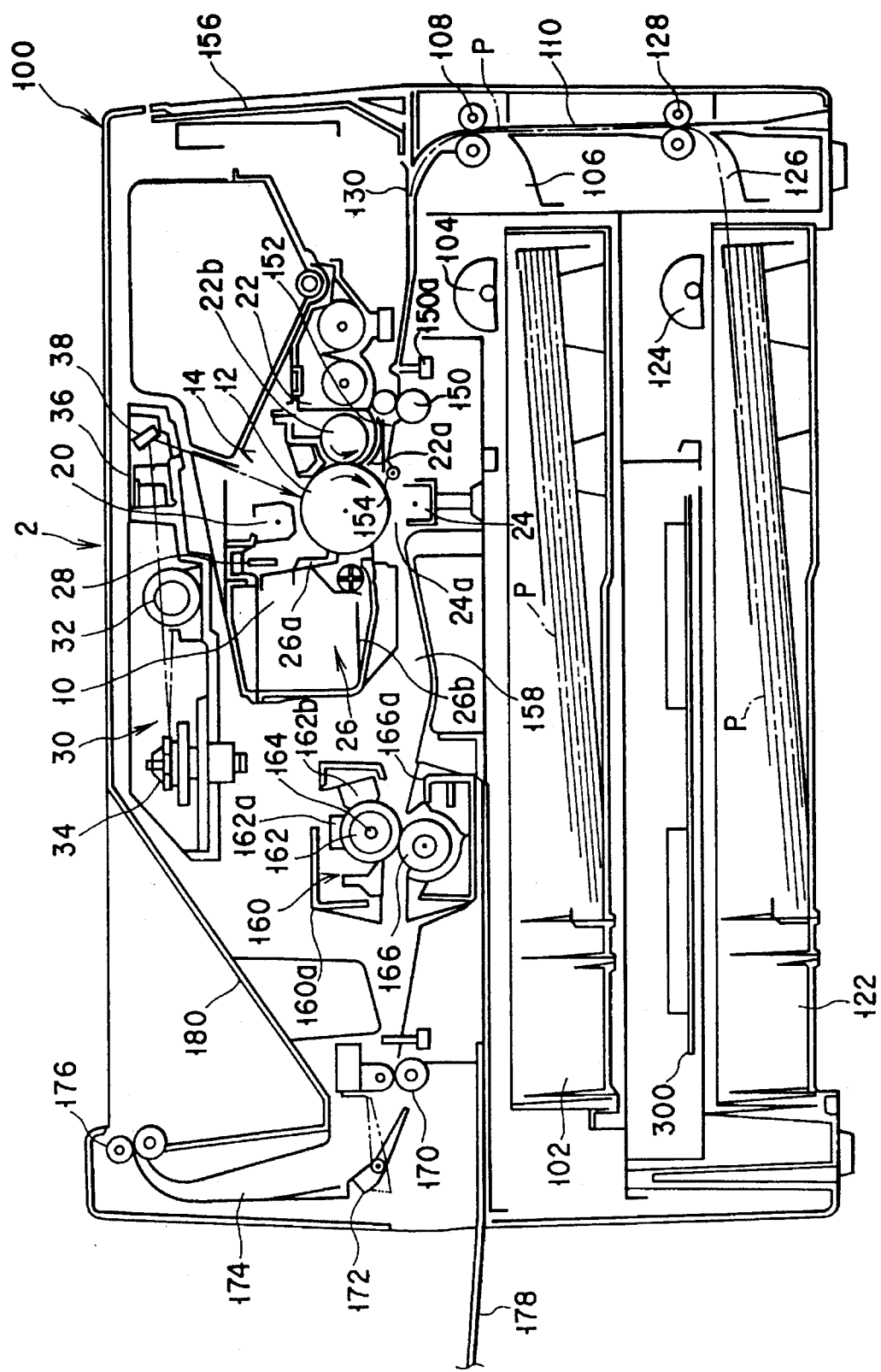
FIG. 1 is a schematic view showing a printer apparatus into which one embodiment of the present invention is incorporated.

FIG. 1 shows the outline of an image forming apparatus, that is, a laser beam printer apparatus, into which one embodiment of the present invention is incorporated.

The image forming apparatus, that is, a laser beam printer apparatus 2 comprises an image forming section 100 including a photoconductor drum 12, which is rotatable along an arrow and cylindrically formed, a toner image forming unit 10 for forming an image on the drum 12 based on image data supplied from the outer unit. In the image forming section 100, sheet material P is fed to the toner image unit 10, so that the image, which is formed by the toner image forming unit 10, is outputted to sheet material P as a hard copy.

The toner image forming unit 10 is formed to be detachable from the image forming section 100. In the image forming section 100, there are detachably formed first and second cassettes 102 and 122 (to be described later) containing sheet material P to which the image is transferred through the photoconductor drum 12.

A charging unit 20, a developing unit 22, a transferring unit 24, a cleaning unit 26, and a pre-lighting unit 28 are arranged in order along the rotational direction of the photoconductor drum 12 of the toner image forming unit 10. The charging unit 20 charges a predetermined amount of charge on the surface of the photoconductor drum 12. The developing unit 22 is arranged to be opposite to the photoconductor drum 12, and developing area 22a is formed between the photoconductor drum 12 and the developing unit 22. Then, toner is supplied to an electrostatic latent image formed on the photoconductor drum 12, so that image data to be outputted is developed. The transferring unit 24 is arranged to be opposite to the photoconductor drum 12, and transferring area 24a is formed between the photoconductor drum 12 and the toner image forming unit 10. Then, a toner image, which is formed on the photosensitive drum 12, is transferred onto sheet material P, which is fed from one of the cassettes. The cleaning unit 26 scrapes remaining toner from the photoconductor drum 12. The pre-lighting unit 28 stabilizes the amount of charge charged on the drum 12.

The photoconductor drum 12 is rotated at a rotating speed in accordance with a record density (the number of laser beams radiated from a laser beam exposer unit 30 per inch) by a motor (not shown).

In the charging unit 20, a grid screen is provided between a corona wire and the photoconductor drum 20, and scorotron, which can control the quantity of charge directing to the photoconductor drum 20, is used.

In the developing unit 22, there is provided a magnet roller 22b for supplying developer in which toner (not shown) and carrier (not shown) are mixed toward the developing area 22a. Then, toner is selectively supplied to the electrostatic latent image formed on the photoconductor drum 12, so that image data to be outputted is developed. A toner cartridge (not shown) is detachably provided to the developing unit 22, and toner is supplied in accordance with quantity consumed when the electrostatic latent image is developed.

In the transferring unit 24, there is used scorotron for drawing the toner image, which is formed on the photoconductor drum 12, to sheet material p.

The cleaning unit 26 includes an elastic blade 26a contacting the photoconductor drum 12 and a toner collecting case 26b. The cleaning unit 26 scrapes remaining toner of the toner image, which is developed by the developing unit 22 and transferred to paper P by the transferring unit 24, from the photoconductor drum 12, and collects remaining toner.

A slit-aperture 14, which is used to radiate the laser beam onto the photoconductor drum 12 from a laser beam exposer unit 30 (to be described later), is provided between the charging unit 20 of the toner image forming unit 10 and the developing unit 22.

The laser beam exposer unit 30 is arranged at the slit-aperture 14 of the toner image forming unit 10, that is, the position where the laser beam can be radiated toward the photoconductor drum 12. The laser beam exposer unit 30 includes a laser diode (not shown) and radiates the laser beam, which has density modulated based on image data to be outputted, to the photoconductor drum 12.

The laser beam exposer unit 30 is formed such that record density of 600 dots per inch [dpi] can be provided. A predetermined beam spot corresponding to 600 [dpi] is provided to the laser beam, which is generated from the laser diode (not shown) through a converting lens 32, and sequentially deflected in an axial direction of the photoconductor drum 12 by a deflecting device, that is, a polygonal mirror 34. Convergence is provided to the laser beam deflected by the polygonal mirror 34 such that the same size of the beam spot (not shown) can be obtained at any position on the photoconductor drum 12 by a fθ lens 36. Then, the laser beam is reflected by an outputting mirror 38, and radiated to the photoconductor drum 12 through an exposing window 14. It is needless to say that the rotation speed of the polygonal mirror 34 correspond to 600 line per inch.

First and second feed rollers 104 and 124, first and second feeding guides 106 and 126, first and second convey rollers 108 and 128, first and second convey guides 110 and 130, an aligning roller 150, a front transfer guide 152, and a transfer guide roller 154 are arranged in order between the cassettes 102,122 and the toner image forming unit 10. The first and second feed rollers 104 and 124, first and second feeding guides 106 and 126, first and second convey rollers 108 and 128, first and second convey guides 110 and 130 are used to draw paper P one by one from one of the cassettes, and to feed the drawn paper P to the transferring area 24a. The aligning roller 150 removes the inclination, which may occur in paper P fed fro each cassette, and adjusts the image formed on the photoconductor drum 12 of the toner image forming unit 10 and the position of paper P. The front transistor guide 152 guides the top end portion of paper P to the photoconductor drum 12. The transfer guide roller 154 is used to surely adhere paper P to the photoconductor drum 12. Additionally, a paper stopping switch 150a is provided between the aligning roller 150 and the second convey guide 130. The paper stopping switch 150a is used to stop paper P in a state that paper P is slightly bent when the top end of paper P to be transferred to the aligning roller 150 runs against the aligning roller 150, and stopped.

In the vicinity of the cassettes 102 and 122, there are arranged a sheet detection switch (not shown) for detecting the presence of paper P contained in each cassette, a sheet size detection switch (not shown) for detecting the size (actually, discrimination code displayed on the cassette) of paper P contained in each cassette, and a cassette detection switch (not shown) for detecting that each cassette is mounted on the laser beam printer 2.

A bypass feeding guide 156, which can feed paper P of various sizes separately from the cassettes 102 and 122, is incorporated into the side portion of the second convey guide 130.

Sheet P, which is inserted into the laser beam printer 2 by the bypass feeding guide 156, is guided to the second convey guide 130, and used in the similar manner as paper P fed from the cassettes 102 and 122.

A toner image forming unit control section 200 (to be described later), which controls the toner image forming unit 10, and a main control section 300 (to be described later), which controls all electronic circuits or electrical parts in the laser beam printer 2, are detachably incorporated into the space between the cassettes 102 and 122 through a containing section (not shown) corresponding to each substrate.

A paper guide 158 is arranged in the direction where paper P is fed to which the toner image is transferred through a transferring area 24a. The paper guide 158 guides paper P to which the toner image is transferred, and a fixing unit 160, which fixes paper P by heating and pressurizing toner of the toner image transferred to the paper P.

The fixing unit 160 includes a heater roller 162 in which a heater lamp 164 is inserted, a pressure roller 166, which is arranged to be extended along an axial line of the roller 162 and pressurized to the roller 162, and a housing 160a for containing the rollers 162 and 166.

The housing 160a is formed to prevent heat from being escaped from the heater 164 in order to ensure a temperature at which desirable fixing can be performed.

The heating roller 162 is a hollow cylinder formed of metal having good heat-conductivity such as aluminum. Then, coating (not shown) is provided on the surface of the heating roller 162 so as to prevent attachment of melted toner. A cleaner 162a is pressurized to the outer peripheral surface of the heater roller 162 along the axial line of the cleaner 162a for removing dirty on the surface of the roller, that is, minute powder and dust from attached toner, or paper P. A thermister 162b is positioned at the outer peripheral surface of the heating roller 162 to detect the temperature of the outer peripheral surface. The heater 164 is controlled based on the temperature of the outer peripheral surface of the roller 162 detected by the thermister 162b, so that the temperature of the outer peripheral surface of the roller 162 is suitably maintained.

In the direction where paper P to which the toner image is fixed by the fixing unit 160 is sent, that is the lower stream of the fixing unit 160, there are arranged a first outputting roller 170, a gate 172, and a second outputting roller 176. The first outputting roller 170 discharges paper P to the outside of the laser beam printer 2. The gate 172 guides paper P sent from the first outputting roller 170 to a reverse pass 174 for reversing the surface of paper P. The second outputting roller 176 discharges paper P, which is reversed by the gate 172 and pass 174, to the outside of the laser beam printer 2. At the position where paper P, which is urged by the roller 170 and passed through the gate 172, is discharged, a paper stock tray 178 is arranged. At the position where paper P, which is branched by the gate 172 and sent by the reverse pass 174 and second outputting roller 176, is discharged, a second tray 180 (a part of outer cover of the image forming section 100) is arranged.

Figure 2:
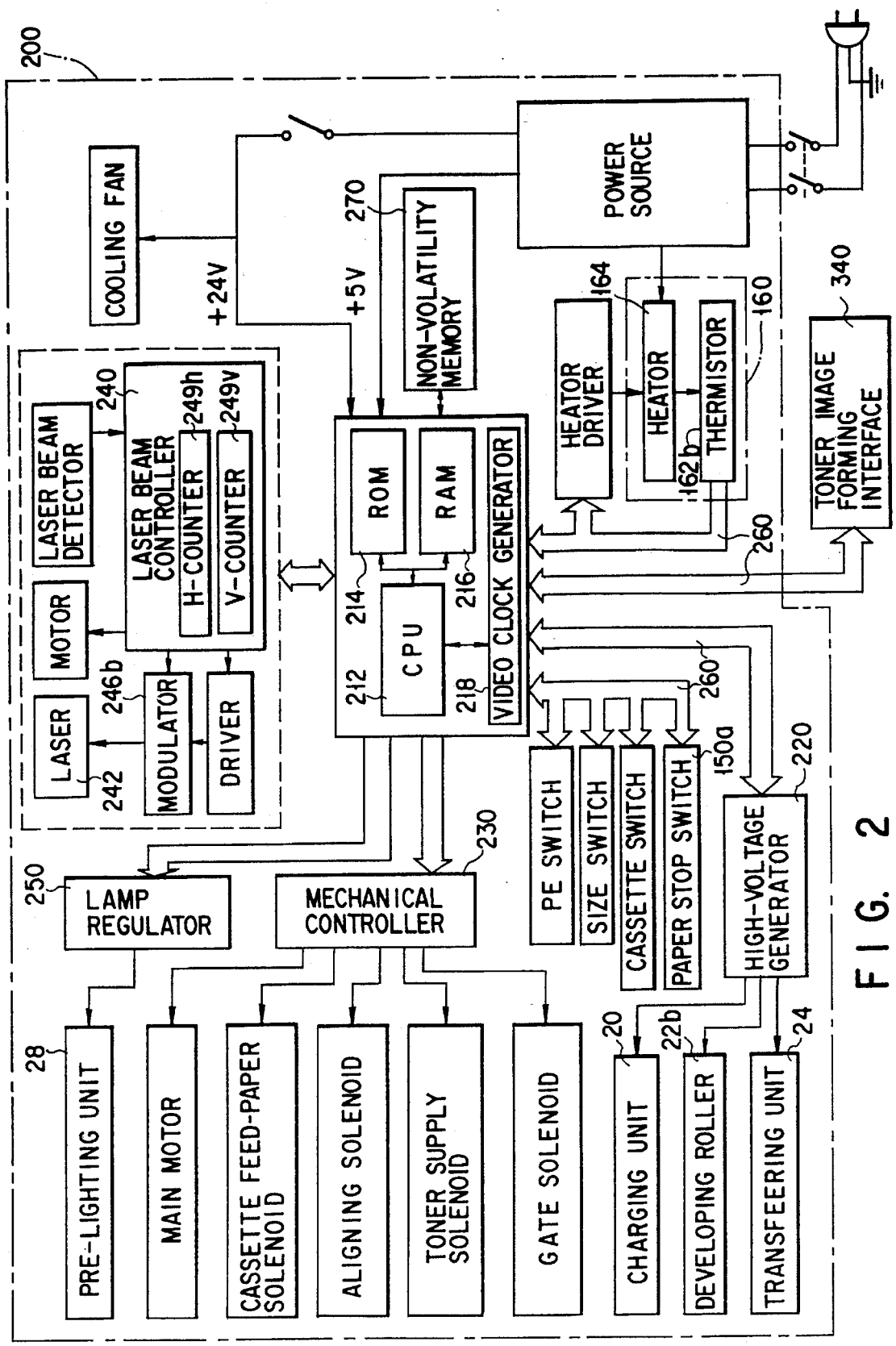
FIG. 2 is a block diagram showing a printer controller incorporated into the printer apparatus of FIG. 1.
Figure 3:
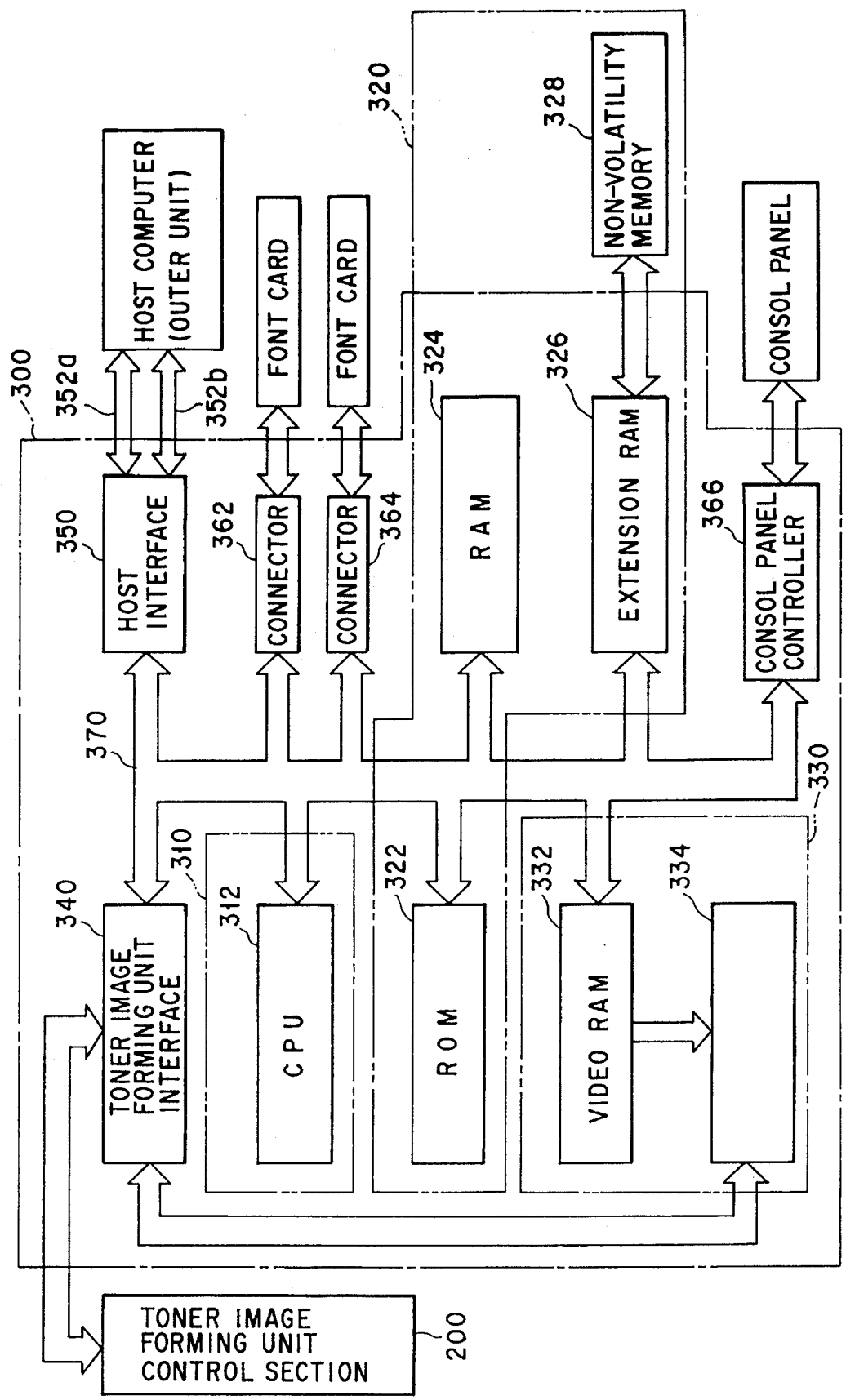
FIG. 3 is a block diagram showing a controller for controlling the entire printer apparatus shown FIGS. 1 and 2.

FIGS. 2 and 3 show the connection among the toner image forming unit control section and the peripheral electronic circuit and the electrical parts, and the connection among the main control section and the peripheral electronic circuits and the electrical parts.

In FIG. 2, the toner image forming unit control section 200 comprises a toner image forming unit control circuit 210 and electronic circuits (including a connector), which are connected to the toner image forming unit control circuit 210, such as a higher voltage supplier 220, a mechanical controller 230, a laser beam control circuit 240, which actuates the laser exposer unit 30, a lamp regulator 250, which actuates the pre-lighting unit 28, and a plurality of inputting/outputting ports (no code) for inputting signals from a large number of switch groups and sensor groups, and a plurality of connectors (no code).

These circuits and elements are mutually connected through an interconnecting bus line 260. The toner image forming unit control circuit 210 comprises a CPU 212, a ROM 214, a RAM 216, and a video clock generator, separately from a main control circuit 310 (shown in FIG. 3) for controlling the image forming section 100. Also, a writable non-volatility memory 270 in which written data is not erased even when power of the unit is turned off is connected to the toner image forming unit control circuit 210 through a bus line 260.

Voltage of +5V and voltage of +24 V are applied to the unit control circuit 210 from the power supplier arranged in the image forming section 100.

voltage of +5 V is used in the toner image forming unit 10 and the signal of the toner image forming unit control section 200. Voltage of +24 V is applied to the toner image forming unit control circuit 210 through cover off switches arranged in all outer covers (not shown), which the user can open and close, provided in the image forming section 100. Then, the voltage is applied to the respective electric parts through the electronic circuits including the control circuit 210 and the connecting circuit connected to the control circuit 210.

Voltage of +24 V is interrupted at the time when one of the outer covers of the image forming section 100 is opened. Due to this, even if the cover is opened by a user, the user can be protected.

ROM 214 stores a control routine for operating the process unit 10, a printing start position, which is specified in accordance with the shape of the sheet (laser exposing start position to the length of the photoconductor drum 12), position data corresponding to the center of the photoconductor drum 12, and a calculation method for outputting the predetermined symbols to the arbitrary position of the paper P whose size and direction to be printed are provided.

The video clock generator 218 generates a video clock, which is used to control the position of the laser beam in the main scanning direction. The video clock generated from the video clock generator 218 is used to define timing in the main scanning direction of the image formed by the process unit 10. The video clock is also used as a synchronizing signal in expanding printing data supplied from the outer unit through the main control section 300.

The higher voltage supplier 220 comprises a charge voltage generating circuit (not shown) for generating high voltage to be applied to the charging unit 20, a developing bias generating circuit (not shown) for generating a developing bias voltage applied to the developing roller 22a of the developing unit 22, and a transfer voltage generating circuit (not shown) for generating high voltage applied to the transferring unit 24. The higher voltage supplier 220 supplies a predetermined high voltage to each unit through a wire bound (not shown).

A motor driving circuit (not shown), and a solenoid driving circuit are connected to the mechanical controller 230. The mechanical controller 230 is actuated to independently or simultaneously drive the main motor, the paper-feeding solenoid, the aligning solenoid, the toner supplying solenoid, or the gate solenoid. It is noted that the pre-lighting unit 28 is turned on (off) by a predetermined timing through a lamp regulator 250.

The laser beam control circuit 240 comprises a semiconductor laser 242, a motor 244 for operating the polygonal mirror 34, a laser driver 246a for oscillating the semiconductor laser 242, a laser beam modulation circuit 246b for density-modulating the laser beam outputted from the laser, a laser power monitor detector 248, a horizontal (main scanning) direction counter 249h and a vertical (sub-scanning) direction counter 249v for fetching positioning data to be used so as to adjust the position of the laser beam outputted from the laser 242 to the coordination on bit map data. The laser beam control circuit 240 intermittently generates the laser beam based on image data supplied through the image forming section 100, so that an electrostatic latent image is formed on the photoconductor drum 12.

Marks or symbols, which are stored in ROM 214, are added to the laser beam modulation circuit 246b in addition to final printing data supplied from the parallel-serial converter 334.

The horizontal (main scanning) direction counter 249h counts the number of dots of laser beams provided in the main scanning direction in the printing area, that is, the video clocks. The vertical (sub-scanning) direction counter 249V counts the number of laser beams of laser beams provided in the sub-scanning direction in the printing area, that is, how many times the horizontal synchronizing signal H-sync is outputted.

A toner empty sensor, a toner density sensor, a cassette detecting switches, a size detecting switches, a paper aligning detecting switch, a paper empty switches and paper outputting detecting switches are connected to the inputting/outputting ports (not shown) and the connecting circuit (not shown), respectively. Then, the operation state of the toner image forming unit 10 and that of each part of the image forming section 100 are inputted.

In FIG. 3, the main control section 300 comprises the main control circuit 310, which has CPU 312 and controls the image forming section 100, a memory section 320 having ROM 322, RAM 324, and extension RAM 326 and a non-volatility memory 328i, and a data expanding section 330 including a video RAM 332 and a parallel-serial converter 334. Also, the main control section 300 comprises a toner image forming unit interface 340 for adjusting the condition of a signal transmitting and receiving between the toner image forming unit control circuit 210 and the main control circuit 310, a host interface 350 for adjusting the condition of a signal transmitting and receiving between the outer unit for supplying image data such as the host computer and the main control circuit 310, connecting circuits 362 and 364 to which the outer unit such as a memory card, e.g. font ROM card is connected, and a panel controller 366 to which the console panel is connected. These circuits and elements are mutually connected through a bus line 370.

The main control circuit 310, that is, CPU 312 initializes the image forming section 100 based on the program stored in ROM 322 in advance, e.g., data, which is necessary for outputting the image based on image data supplied from the host computer, such as a top margin, right and left margins, and a shape of paper. Then, the toner image forming unit 10 is actuated based on inputted image data, and a desired image is outputted. Also, the video clock, which is supplied from the video clock generator 218 of the toner image forming unit 10, is used as a synchronizing signal, in order to control the expansion of the printing signal to bit map data due to the video RAM 332.

In ROM 322, there are stored a control routine for operating the image forming unit 100, a password, which is checked in changing data, printing data, which is necessary for outputting the image based on image data supplied from the host computer, such as a top margin, right and left margins, and a shape of paper are stored. Moreover, separately from the above-explained ROM 214 connected to the toner image forming unit control circuit 210, there is stored a laser exposer starting position, data of a position corresponding to the center of the photoconductor drum 12, a predetermined symbol, and a calculating method for outputting the symbol to an arbitrary position of printing paper.

RAM 324 temporarily stores image data supplied from the host computer, and is used as a buffer for data processed by the main control circuit 310.

The Extension memory 326 is used so as to temporarily store a large amount of data, which cannot be stored in RAM 324.

The non-volatility memory 328 sequentially stores working time of the image forming section 100 (the total number of prints) and using time of the toner image forming unit 10 (the number of print per unit).

The video RAM 332 stores parallel data, which is expanded to a bit image (printing data for print-output).

The parallel-serial converter 334 converts parallel data stored in the video RAM 332 to serial data, which is used to density-modulation of the laser beam outputted to the photosensitive drum from the laser exposer unit 30.

The toner image forming unit interface 340 is used to adjust the condition of a data transmitting and receiving between the data expanding section 330 and the toner image forming unit 10 (image forming section 100). Then, the toner image forming unit interface 340 sends image data, which is converted to serial data, to the laser exposer unit 30.

The host interface 350 comprises a serial transfer line 352 and a parallel transfer line 354, and is used to adjust the condition of a data transmitting and receiving in accordance with the types of data to be transferred.

The main control circuit 310, ROM 322, RAM 324, video RAM 332, printer interface 340, host interface 350, and the input/output circuit group are mutually connected by an inner bus line 370. Also, the inner bus line 370 is used in the mutual data transferring.

The following will explain an operation of the image forming section 10.

The main switch (not shown) is turned on, so that the image forming section 100 is initialized along the program stored in ROM 332.

Image data, which is supplied from the outer unit, such as the wordprocessor or the host computer through the host interface 350, is sequentially stored in RAM 324 (and extension RAM 326 in accordance with the amount of data).

More specifically, when the image forming section 100 is initialized, RAM 324 (and extension RAM 326) is maintained in a standby state of image data input from the host computer.

The printing start signal outputted from the host unit (not shown) is inputted to the main control section 300, so that the toner image forming unit 10 is set to the standby state by the control circuit 210 of the toner forming unit 10. In connection with this operation, the video clock is generated from the video clock generator 218, and supplied to the main control circuit 210 in the toner image forming unit 10.

Image data inputted to RAM 324 is expanded in RAM 324 (or extension RAM 326) based on the shape of paper P (size and direction) and the size of each margin, which are stored in ROM 322. Then, image data is converted to parallel data and supplied to the video RAM 332 as the horizontal synchronizing signal H-sync is controlled by the video clock supplied from the video clock generator 218. Parallel data stored in the video RAM 332 is converted to serial data by the parallel-serial converter 334, and timing (the horizontal synchronizing signal H-sync) is adjusted by the video clock supplied via the main control section 300, and the serial data is supplied to the laser exposer unit 30 every data for one line.

Separately from image data supplied from the host computer, as image data inputted to the laser exposer unit 30, printing data of the marks in accordance with the user's requirement or the predetermined symbols sent from ROM 214 such as a center mark showing the center of each side of paper P and a frame line, which is used for the scale of paper P to the arbitrary position or the examination of the shift between the position at which paper P is transferred the image formed on the photoconductor drum 12 is synthesized by the following method.

Figure 4:
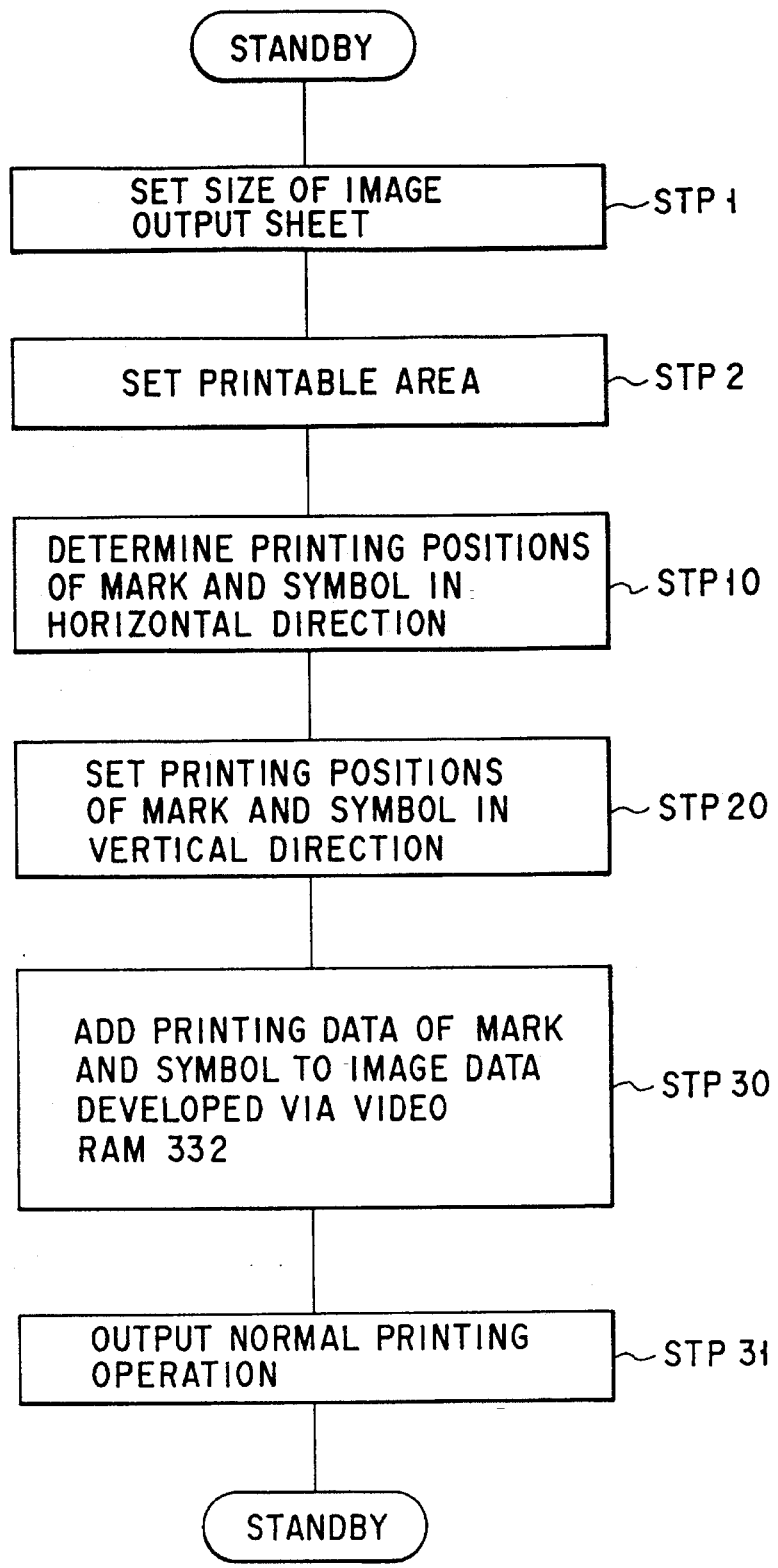
FIG. 4 is a flow chart showing steps for adding new printing data in connection with the printer apparatus shown in FIGS. 1 to 3.

More specifically, printing data for printing marks or symbols is expanded to bit map data in RAM 324 (or extension RAM 326) based on the steps shown in FIG. 4 in a state that the video clock supplied via the main control section 300 is used as the horizontal synchronizing signal H. Then, image data is converted to parallel data and supplied to the video RAM 332 as the horizontal synchronizing signal H-sync is controlled by the video clock supplied from the video clock generator 218. Parallel data supplied to the video RAM 332 is transmitted to the laser exposer unit 30 via the parallel-serial converter 334, toner image forming unit interface 340, and CPU 212 (toner image forming control circuit 210 in order. Then, the marks or symbols, which are stored in ROM 214 by the laser modulation circuit 246b of the exposer unit 30, are added onto bit map data. It is needless to say that printing data of marks and symbols may be supplied through the outer ROM such as an IC card, which is connected to ROM 322 of the image forming section 100 or the connecting circuit 362, or the connecting circuit 364.

More specifically, the size of paper P (that is, the cassette containing paper P having the corresponding size) to be outputted is selected based on the output signal from the outer unit, i.e., host computer or the instruction from the console panel (Step 1). Then, a printable image area, which is defined in accordance with the size of the selected paper P, is set (Step 2). Sequentially, the printing positions of horizontal and vertical directions for printing marks or symbols at an arbitrary position of the set image area are determined (Steps 10 and 20). The printing positions of the horizontal and vertical direction of the marks or symbols, which are individually set, are synthesized, and added onto already-extended image data (Step 30), and outputted (printed out) in accordance with the normal image forming operation (Step 31).

In step 30, either method as explained below may be used:

More specifically, a method in which position data of marks or symbols (printing data) is compared with the printing data of image data, which is printed at present, by numerical counting, and printing data is added to image data (the position where printing data is added is relatively defied against image data); a method in which position data of printing data is programmed in advance and printing data is added to image data at the programmed (the position where printing data is added is defined by an absolute value, which is on basis of the photoconductor drum 12 of the toner image forming unit 10); or a method in which position data of printing data is programmed in advance, and position data is added to image data at the programmed position (the position where printing data is added is defined to an absolute value on the basis of the photoconductor drum 12 of the toner image forming unit 10).

In FIG. 5, in connection with the printing position of the horizontal direction, the horizontal count of the set image area, that is, the number of video clocks per line is set (step 11). In other words, it is discriminated how many times the clock is outputted to set one line. Sequentially, it is discriminated whether or not the video clock is present, and the printing data control system is confirmed (step 13). In step 14, the position where the marks or symbols are printed is set. That is, it is set at which position of the horizontal direction the marks or symbols are printed. In step 15, it is discriminated whether or not the set position satisfies the condition set in step 11.

Figure 6:
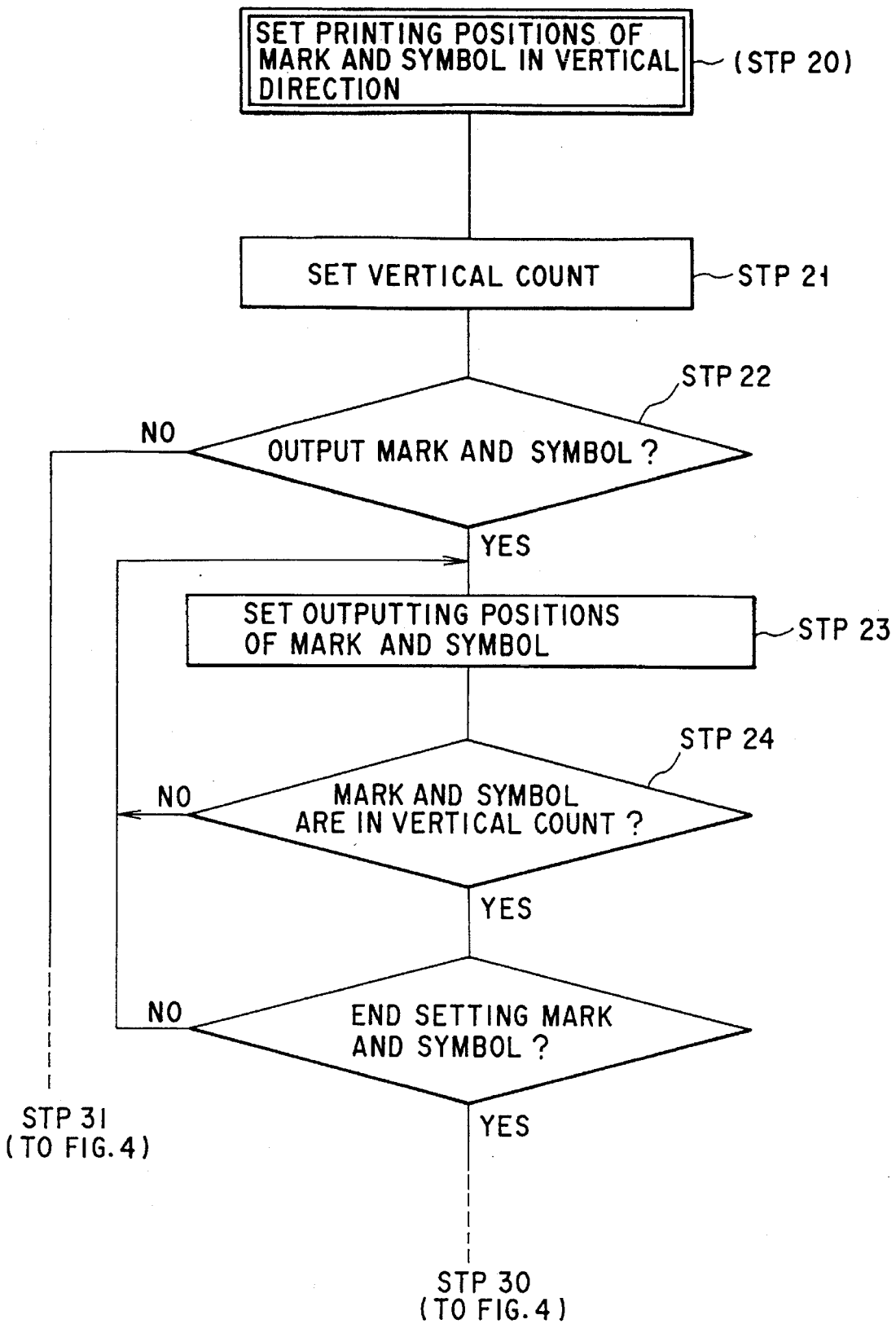
FIG. 6 is a flow chart showing the processing in the vertical direction in connection with the flow chart shown in FIG. 4.

In FIG. 6, in connection with the printing position of the vertical direction, the vertical count of the set image area, that is, the number of scannings per page is set (step 21). In other words, it is discriminated how many times the horizontal synchronizing signal HSYNC is outputted to set one page. Sequentially, it is discriminated whether or not the marks or symbols are printed at the arbitrary position (step 22).

Under this state, in step 23, the position where the marks or symbols are printed is set. That is, it is set at which position of the vertical direction the marks or symbols are printed. In step 24, it is discriminated whether or not the set position satisfies the condition set in step 21.

According to the above method, in the case that the record density of the toner image forming unit 10 is 600 [dpi], it is set that the number of the video clocks=600 (main scanning direction) in step 14 of FIG. 5 and that the line intervals=120 (=$\frac{5}{600}$, sub scanning direction) in step 23 of FIG. 6, so that a mark having a pitch=one inch, i.e., length=⅕ inch is printed as shown in area A of FIG. 9.

Moreover, it is set that the number of the video clocks= $\frac{5}{600}$ in step 14 (only one time every one scanning in accordance with the horizontal synchronizing clock and that the line intervals=120 (=$\frac{5}{600}$) in step 23, so that the mark having a pitch=⅕ inch, i.e., length=⅕ inch is printed as shown in area B of FIG. 9.

Similarly, the number of video clocks is set to 600 clocks from each of right and left sides of paper P and the line intervals are 600 lines from each of the top and rear ends of paper P. Thereby, the position mark can be printed at the inner position by one inch from each side of paper p (FIG. 10).

On the other hand, in accordance with inputted data or the control signal inputted from the console panel, a paper cassette, which contains paper p suitable for printing data to be outputted, is selected, and set to be in a standby state for transferring a toner image to be described later.

In other words, the printing start signal is inputted to the main control section 300, so that the printing start signal is inputted to the control circuit 210 of the toner image forming unit 10 via the printer interface. Then, the toner image forming unit 10 is set to the the print standby state by the control circuit 210. More specifically, the cassette feeding solenoid is biased by the mechanical controller 230, and one paper P is drawn from the selected cassette. The drawn paper P is transferred to the second convey guide 130 through the corresponding drawing roller and paper guide, and further transferred to the aligning roller 150 through the second convey guide 30.

Then, it is discriminated that the paper stopping switch 150a is turned on at the time right before the top end of paper P reaches the aligning rollers 150. Moreover, it is discriminated that the top end of paper P reaches the aligning rollers 150 at the time when a predetermined period of time passes after the paper stopping switch 150a is turned on. Then, the feed roller (not shown) is stopped by the control circuit 210, so that paper P is temporarily stopped.

At this time, the main motor is driven by the control of the control circuit 210, so that the photoconductor drum 12 is rotated at a desired speed, and a desired potential is applied to the surface of the photoconductor drum 12 by the charging unit 20. At the same time, the selected paper P is picked up by the corresponding pick-up roller and paper guide, and fed to the aligning rollers 150.

Thereafter, a V-sync request signal is outputted to the main control circuit 310 from the control circuit 210. Then, a V-sync signal is supplied to the control circuit 210 from the main control circuit 310 in response to the V-sync request signal. By the input of the V-sync signal, the aligning solenoid is driven by the mechanical controller 230, and the aligning roller 150 is rotated. Therefore, paper P is fed to the transfer area 24a again.

After passing a predetermined period of time (for reserving a predetermined margin between the top end of paper P fed by the rotation of the aligning roller 150 and the image formed on the photoconductor drum 12, e.g., 40 msec) since the input of the V-sync signal to the control circuit 210, printing data, which is stored in the video RAM 322, that is, parallel data is converted to serial data for every one line in a state that the video clock is used as a horizontal synchronizing signal by the control of the main control circuit 310, and serial data is supplied to the laser exposer 30 of the image forming unit 10. Then, printing data and adding data are superimposed on serial data supplied to the laser exposer 30 by the routine control shown in FIGS. 4 to 6.

Image data, which is converted to serial data and which printing data such as marks or symbols is added, is supplied to the laser exposer unit 30 in accordance with a vertical synchronizing signal from a vertical synchronizing control circuit (not shown).

Then, density of the laser beam generated from the laser is continuously changed in accordance with data. The laser beam whose density is continuously changed in accordance with data is continuously transmitted to the photoconductor drum 12, and converted to an electrostatic latent image. The image, which is converted to the latent image on the photoconductor drum 12, is guided to the developing area, which is opposite to the developing unit 22, with the movement of the photoconductor drum 12. Then, toner is selectively supplied to the latent image and developed by the developing unit 22, and transferred to the transfer area, which is opposite to the transferring unit 24, with the rotation of the photoconductor drum 12.

On the other hand, the top end of the image and that of paper P are adjusted to each other in accordance with the vertical synchronizing signal from the vertical synchronizing circuit (not shown), and the paper P, which is temporarily stopped at the aligning roller 150, is fed to the photoconductor drum 12. Therefore, the toner image on the photoconductor drum 12 and paper P are attached to the photoconductor drum 12 by the charge remaining on the photoconductor drum 12 by a predetermined timing. Thereafter, by the control of CPU 210, the electrical charge having the same polarity as the electrical charge, which is already applied to the photoconductor drum 12 for forming the latent image, is applied to the photoconductor drum 12 from the transferring unit 24, and the toner image formed on the photoconductor drum 12 is transferred to paper P.

Paper p on which the toner image is mounted is guided to the fixing unit 160, toner, which has a heat melting property, is melted, and the toner image is fixed to paper p by the fixing unit 160.

On the other hand, the photoconductor drum 12 in which paper p and the toner image are separated is further rotated, and returned to the initial state by the cleaning unit 26 for the next image formation.

Paper p on which the toner image is formed by the series of image forming process, is stocked in the stock tray 178 or 180 where paper p is discharged through the gate 172.

According to FIGS. 4 to 6, printing data such as the marks or symbols stored in ROM 214 of the toner image forming unit 10 is superimposed on image data, which is expanded by the main control section 300 of the image forming section 100, by CPU 212. Thereby, the laser beam radiated to the photoconductor drum 12 from the laser exposer unit 30 is changed to the state that image data and printing data are synthesized.

Figure 7A:
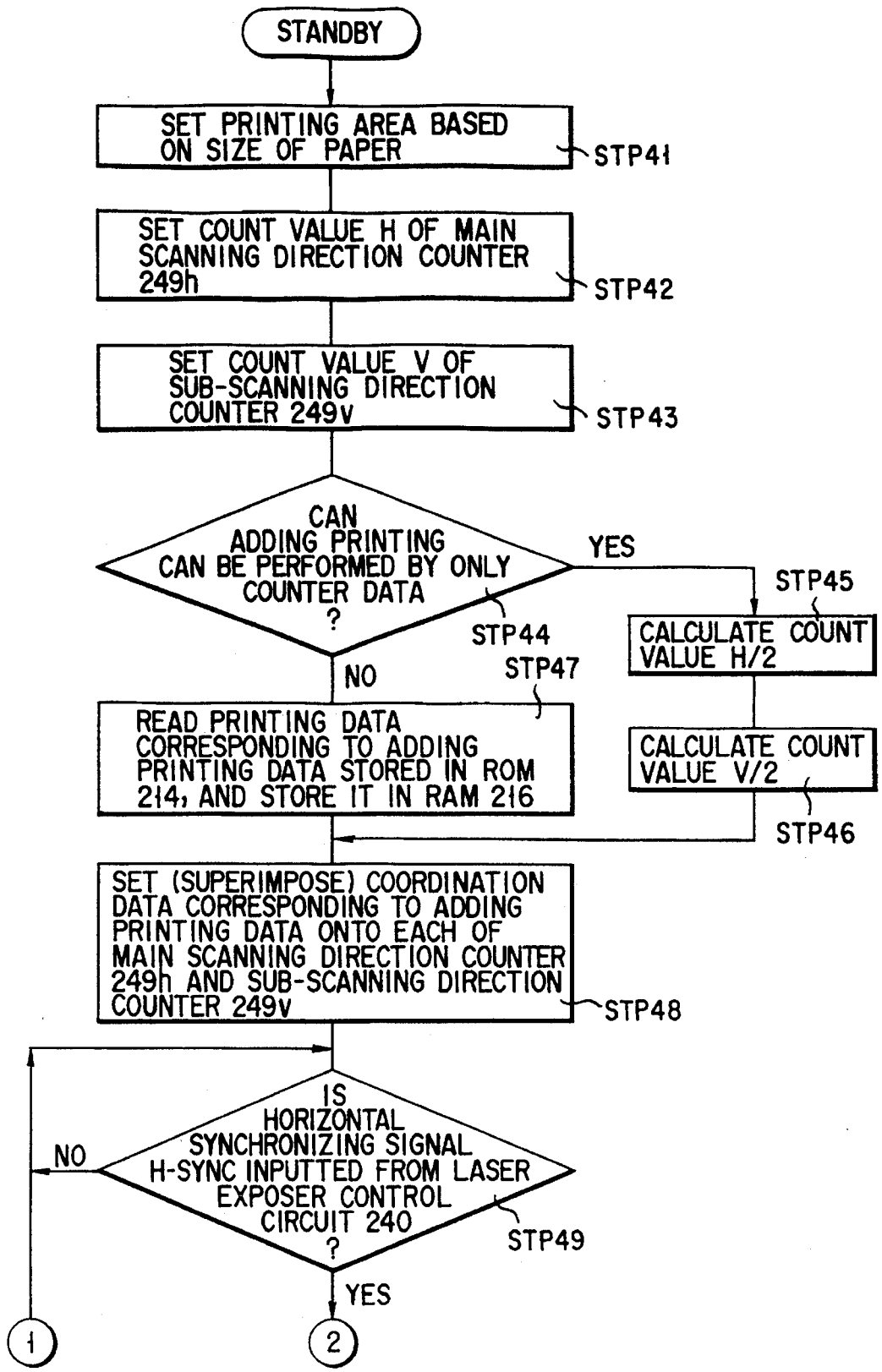
FIGS. 7A and 7B are flow charts showing a modification of a method of newly adding printing data as shown in FIG. 4.
Figure 7B:
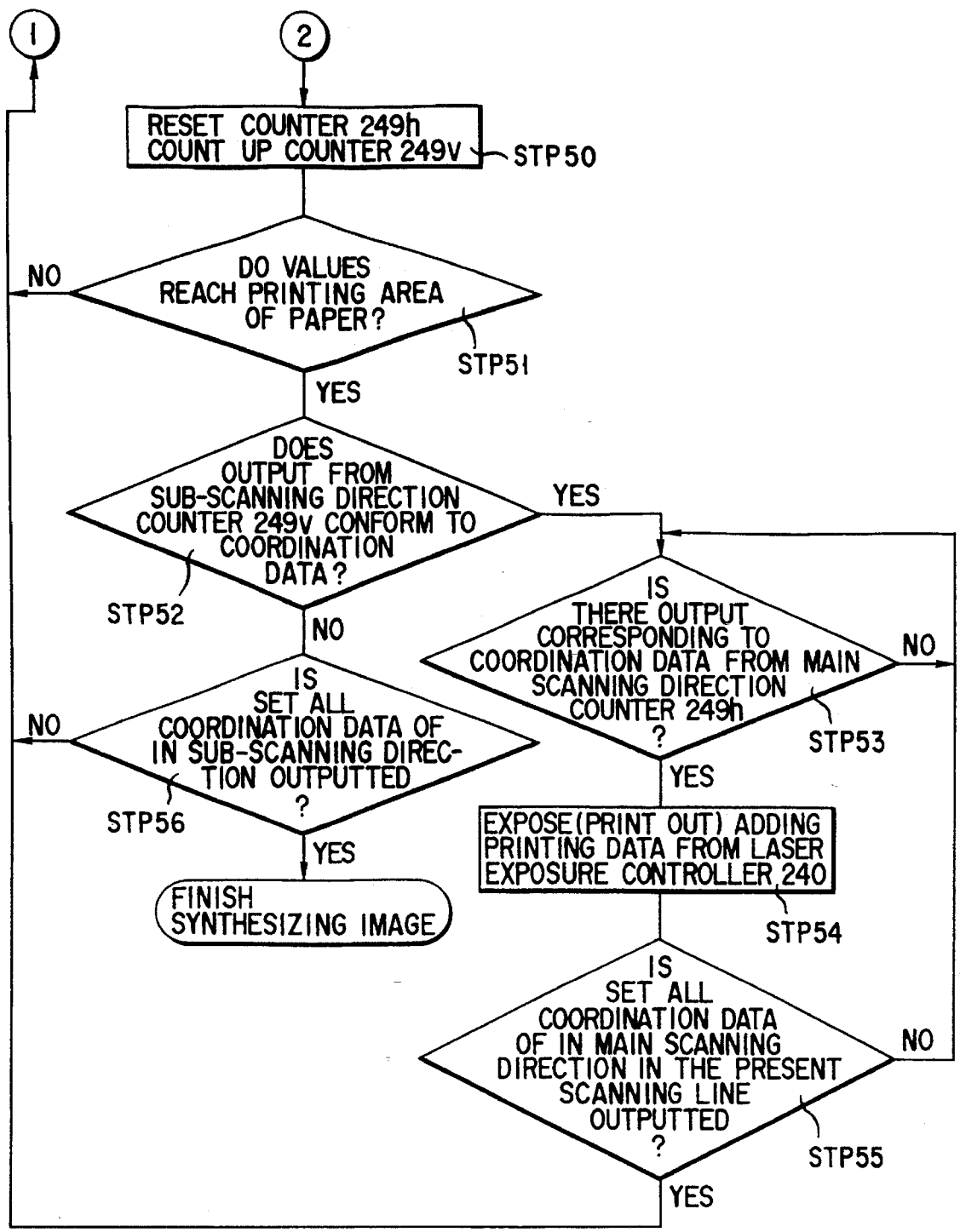

In FIGS. 7A and 7B, there are shown an example of calculating the position (mark) for printing the mark showing the the center of paper P in the center of each side of paper P.

According to FIGS. 7A and 7B, a printable image area is set in accordance with the size of paper P by the control of CPU 210 (step 41). Sequentially, a count value H of the main scanning direction counter 249h (the number of video clocks per one line) is set by the control of CPU 210 (step 42). Also, a count value V of the sub-scanning direction counter 249v (the number of scanning times for forming an image area of paper) is set by the control of CPU 210 (step 43).

In step 44, it is discriminated whether or not adding printing data includes only counter data, that is, a specific pattern(s) including a character(s) or a drawing(s) exists in adding printing data by the control of CPU 210. If it is discriminated that adding printing data does not include data other than counter data (step 44-Y), in order to print out the marks on the center of the paper P, a ½ value of the main scanning direction counter value H can be obtained by the control of CPU 210 in step 45, and same as step 45, a ½ value of the sub-scanning direction counter value V can be obtained in step 46. If it is discriminated that adding printing data includes data other than counter data (step 44-N), printing data corresponding to adding printing data stored in ROM 214 is read and once stored in ROM 216 (step 47).

Then, coordination data corresponding to adding printing data is set to each of the main scanning direction counter 249h and the sub-scanning direction counter 249v. In other words, the position where printing printing data is superimposed on printing data supplied to the process unit 10 via the main control circuit 300 is set to each of the counters 249h and 249V by CPU 210 (step 48).

As explained above, by the control of CPU 210, one paper P is drawn from the cassette 102 or 122 containing the sheet material of the selected size and stops and waits in a state that the top end of paper P reaches the aligning rollers 150. In other words, paper P waits in a state that paper p is fed to the transfer area 24a at the time when the V-sync signal is inputted. Also, the main motor is driven by the control of the control circuit 210, so that the photoconductor drum 12 is rotated at a desired speed, and a desired potential is applied to the surface of the photoconductor drum 12 by the charging unit 20. At the same time, the selected paper P is picked up by the corresponding pick-up roller and paper guide, and fed to the aligning rollers 150. Thereafter, a V-sync request signal is outputted to the main control circuit 310 from the control circuit 210. Then, a V-sync signal is supplied to the control circuit 210 from the main control circuit 310 in response to the V-sync request signal. By the input of the V-sync signal, the aligning solenoid is driven by the mechanical controller 230, and the aligning roller 150 is rotated. Therefore, paper P is fed to the transfer area 24a again.

After passing a predetermined period of time (for reserving a predetermined margin between the top end of paper P fed by the rotation of the aligning roller 150 and the image formed on the photoconductor drum 12, e.g., 40 msec) since the input of the V-sync signal to the control circuit 210, printing data, which is stored in the video RAM 322, that is, parallel data is converted to serial data for every one line in a state that the video clock is used as a horizontal synchronizing signal by the control of the main control circuit 310, and serial data is supplied to the laser exposer 30 of the image forming unit 10. Then, printing data and adding data are superimposed on serial data supplied to the laser exposer 30 by the routine control shown in FIGS. 4 to 6.

In step 48, coordination data, which corresponding to adding printing data, is inputted to each of counters 249h and 249v, and a laser beam is generated from the laser exposer 30 in response to the V-sync signal by the control of CPU 210. A part (top end portion of one line) of the laser beam is inputted to a horizontal synchronizing detection circuit (not shown), thereby generating an H-sync signal. By the input of the H-sync signal to CPU 210, the laser beam for one line is generated from the laser exposer (step 49). By the generation of the laser beam for one line, the main scanning direction counter 249h is reset and the sub-scanning direction counter 249v is added by one (step 50). Steps 49 and 50 are repeated until the position where the laser beam is radiated at present reaches the printing area set in step 41 (step 51).

On the other hand, at the time when the V-sync signal is outputted from the main control circuit 300, the aligning solenoid is turned on, and the aligning roller 150 is rotated, and paper P is transferred at a constant speed. As already explained, the photoconductor drum 12 is rotated at a constant speed. Therefore, by the control of CPU 210, the laser beam is radiated from the laser exposer 30, so that the latent image corresponding to printing data is formed at a predetermined position of the photoconductor drum 12 in order.

Sequentially, the output of the sub-scanning direction counter 249v and coordination data set in step 48 are compared with each other so as to check the sub-scanning direction position (line) of adding printing data added to printing data (step 52). If the sub-scanning direction position (line) corresponds to the above-mentioned coordination data, it is checked, in step 53, whether or not there is printing data of the main scanning direction corresponding to the sub-scanning direction position (line) checked in step 52. In steps 52 and 53, if it is checked that the count values V and H reach the coordination of adding printing data to be added (superimposed) onto printing data, adding printing data is added (superimposed) onto the laser beam, which is turned on/off in accordance with printing data, by the control of CPU 210. In step 54, it is checked whether or not all adding printing data, which exists on the same line, is added (superimposed), and steps 53 to 55 are repeated until the check of the rest of coordination data is finished.

On the other hand, in step 52, if there is no coordination data corresponding to the sub-scanning direction position, the rest of coordination data, which corresponds to the count value V set in the sub-scanning direction counter 249v, is checked, and steps 51 to 52 are repeated until the check of the rest of coordination data is finished (step 56).

As mentioned above, the laser beam is sequentially radiated based on printing data in which all adding printing data and printing data are synthesized with other. Then, at the time when the final end portion of the printing area, that is, the count value H of the sub-scanning direction counter 249v conforms to the maximum value defined to correspond to the printing area, the latent image forming is ended.

Sequentially, the photoconductor drum 12 is rotated, the latent image formed in steps 41 to 56 is developed by the developing unit 22. The developed image, that is, the toner image is transferred onto paper P at the transferring area 24a. The toner image transferred to paper P is fixed to paper P by the fixing unit 160.

As explained above, according to FIGS. 7A and 7B, the capacity of ROM 214 provided in the toner image forming unit 10 may be provided to the extent that initial data to be originally stored, and there is no need that the capacity for marks or symbols be reserved. Moreover, in printing out the marks, the method for synthesizing printing data with image data explained in step 30 of FIG. 4 is combined, so that the shift or inclination of paper P when passing the image forming section 100 or the shift between the image outputted on paper P and paper P can be easily detected.

Figure 8:
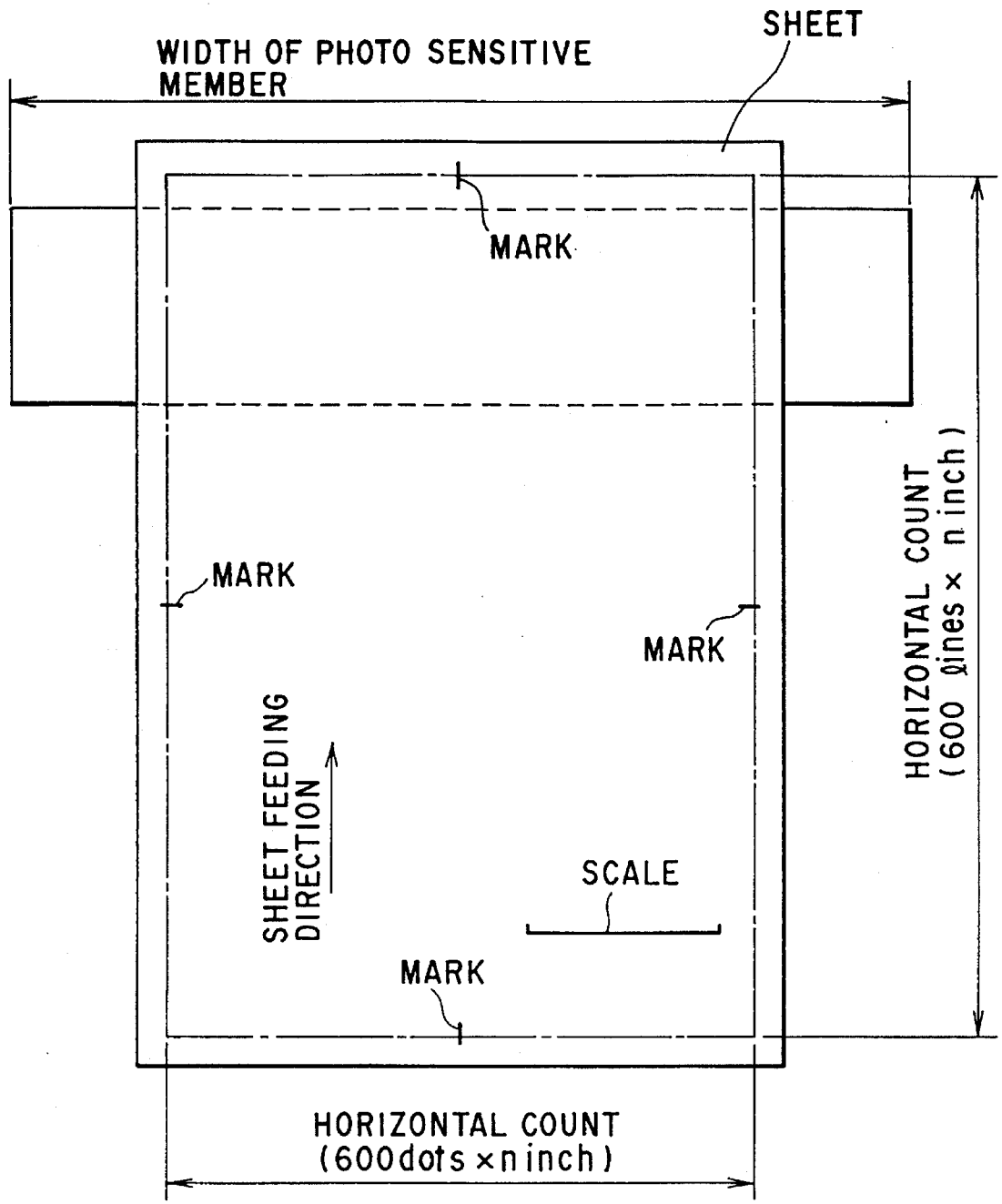
FIG. 8 is a block diagram showing two directions (vertical and horizontal positions) used in the present invention.

FIG. 8 is a schematic view showing one example of marks or symbols to be outputted to paper P and the concept of vertical and horizontal positions. In other words, the coordinate system for setting the position of data to be printed by the method shown in FIGS. 9 through 7B.

FIG. 9 is a schematic view showing an example in which the marks are outputted by the method shown in FIGS. 5 and 6. More specifically, FIG. 9 shows the example of printing in which the number of video clocks is 600 pulses and lines is 600 lines in the case that the record density is 600 [dpi].

FIG. 10 is a schematic view showing an example in which the marks are added to the position one inch away from each side of paper P. As explained above, in the case that the record density is 600 [dpi], the example in which the mark is set to the position of 600 video pulses from each side and 600 lines.

FIG. 11 shows a modification of a method for printing marks or symbols on an arbitrary position of an image area shown in FIG. 4. Adding printing data to be added to image data (printing data is supplied from an outer unit through main control circuit 300.

After steps 1, 2, 10, and 20 shown in FIG. 4, image data supplied from the host computer is expanded to bit map image data through RAM 326, and stored in video RAM 332 (step 61). Sequentially, adding printing data stored in ROM 322 is read, an address on video RAM 332 corresponding to coordination data is read to print read adding printing data (step 62).

The address of adding printing data of the video RAM 332 calculated in step 62 is read through CPU 312 (step 63), and converted to coordination data, which can be used as a printing data, through a printing signal converting circuit (not shown) (step 64). Then, coordination data converted in step 64 is returned to the same address in the video RAM 332 (step 65).

For forming the image based on printing data stored in video RAM 332, adding printing data is supplied to printing data in a state that adding printing data is already superimposed on printing data. Therefore, similar to the method shown in FIGS. 7A and 7B, the marks or symbols of the specific pattern can be synthesized with printing data in the image forming apparatus.

According to the printer apparatus of the present invention, the toner image forming unit control section 200 for controlling the toner image forming unit 10, can arbitrarily add new printing data such as a center mark showing the center of paper to image data, which is converted to bit map data by the main control section 300 for controlling the image forming section 100.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus for forming an image on an image bearing member based on an image data, comprising:

means for generating a clock signal;

means for outputting the image data in response to the clock signal output from the generating means;

means for forming the image based on the image data in a plurality of positions on the image bearing member, each of the positions of the image formed on the image bearing member corresponding to each of the clock signals;

means for setting an adding image to be added in the image;

means for determining a specific clock signal in the clock signals, the specific clock signal representing a position where the set adding image is formed on the image bearing member;

means for detecting that the specific clock signal has been output by the generating means while the forming means forms the image; and means for controlling the forming means so as to form the adding image corresponding to the detecting result by the detecting means irrespective of the image data.

2. The apparatus according to claim 1, wherein the outputting means comprises a video RAM memory means expanding bit map image data in accordance with a predetermined rule so as to form image data outputted by the forming means.

3. The apparatus according to claim 2, wherein the forming means comprises means for charging a surface of the image bearing member, and means for changing the potential of the image bearing member to which the potential is provided by the charging means based on the image data and an adding image data, the adding image data corresponds to the adding image, and a latent image corresponding to each of the image data and the adding image data is formed on the image bearing member.

4. The apparatus according to claim 2, wherein the forming means executes image formation in a first direction of the image bearing member on the basis of the image data corresponding to a predetermined number of clock signals, and repeats the image formation a plurality of times in a second direction perpendicular to the first direction, and is outputted in a state that the adding image data and the image data are synthesized.

5. An apparatus according to claim 1, wherein the forming means executes image formation in a first direction of the image bearing member on the basis of the image data corresponding to a predetermined number of clock signals, and repeats the image formation a plurality of times in a second direction perpendicular to the first direction, thus forming an image.

6. An apparatus according to claim 5, wherein the determining means includes means, responsive to the adding image data, for designating the number of clock signals pertaining to the first direction.

7. An apparatus according to claim 5, wherein the determining means includes means, responsive to the adding image data, for designating the number of times the image formation is repeated in the second direction.

8. An apparatus according to claim 5, wherein the determining means includes means for designating the number of clock signals pertaining to the first direction and designating the number of times the image formation is repeated in the second direction.

9. An apparatus according to claim 5, wherein the forming means includes conveyance means for conveying, one by one, transfer materials onto which the image formed on the image bearing member is to be transferred.

10. An apparatus according to claim 5, wherein the forming means includes means for preventing a transfer material from skewing when the image formed on the image bearing member is transferred onto the transfer material.

11. A method for forming an image on an image bearing member based on an image data, comprising the steps of:

generating a clock signal;

outputting the image data in response to the clock signal;

forming the image based on the image data in a plurality of positions on the image bearing member, each of the positions of the image formed on the image bearing member corresponding to each of the clock signals;

setting an adding image to be added in the image;

determining a specific clock signal in the clock signals, the specific clock signal representing a position where the set adding image is formed on the image bearing member;

detecting that the specific clock signal has been output by the generating step while the forming step forms the image; and controlling the forming step so as to form the adding image corresponding to the detecting result by the detecting step irrespective of the image data.

* * * * *